United States Patent
Ozaki et al.

(10) Patent No.: US 11,319,076 B2
(45) Date of Patent: May 3, 2022

(54) SEAT UNIT AND ATTACHMENT METHOD THEREOF

(71) Applicant: JAMCO CORPORATION, Mitaka (JP)

(72) Inventors: Masaji Ozaki, Mitaka (JP); Michihito Suzuki, Mitaka (JP)

(73) Assignee: JAMCO CORPORATION, Mitaka (JP)

( * ) Notice: Subject to any disclaimer, the term of this patent is extended or adjusted under 35 U.S.C. 154(b) by 113 days.

(21) Appl. No.: 16/500,268

(22) PCT Filed: Dec. 18, 2017

(86) PCT No.: PCT/JP2017/045277
§ 371 (c)(1),
(2) Date: Oct. 2, 2019

(87) PCT Pub. No.: WO2018/185981
PCT Pub. Date: Oct. 11, 2018

(65) Prior Publication Data
US 2021/0129994 A1 May 6, 2021

(30) Foreign Application Priority Data
Apr. 3, 2017 (JP) .............................. JP2017-073606

(51) Int. Cl.
*B64D 11/06* (2006.01)
*B60N 2/015* (2006.01)
(52) U.S. Cl.
CPC ...... *B64D 11/0696* (2013.01); *B60N 2/01558* (2013.01); *B64D 11/0606* (2014.12); *B64D 11/0627* (2014.12); *B64D 11/0648* (2014.12)
(58) Field of Classification Search
CPC ............ B64D 11/0696; B64D 11/0648; B64D 11/0601; B64N 2/01558
See application file for complete search history.

(56) References Cited

U.S. PATENT DOCUMENTS 3,081,059 A * 3/1963 Hastings .................. A47C 3/18
248/580
4,047,689 A * 9/1977 Grendahl .............. B60P 7/0815
410/105
(Continued)

FOREIGN PATENT DOCUMENTS

EP 2759474 A1 7/2014
EP 3141481 A1 3/2017
(Continued)

OTHER PUBLICATIONS

Extended (Supplementary) European Search Report dated Dec. 11, 2020, issued in counterpart EP Application No. 17904645.3. (8 pages).
(Continued)

*Primary Examiner* — Richard R. Green
*Assistant Examiner* — Ashesh Dangol
(74) *Attorney, Agent, or Firm* — Westerman, Hattori, Daniels & Adrian, LLP

(57) ABSTRACT

A seat unit for an aircraft that can be directly fixed at three points to a seat track provided on the floor of the aircraft. One representative seat unit and attachment method thereof relates to a seat unit comprising a lower structure of the seat unit and three fixtures configured to attach the lower structure directly to a pair of seat tracks of a mobile body, wherein the three fixtures include a lateral position adjustment member configured to laterally adjust a fitting position with the pair of seat tracks, a first fixture is fixed to one of the pair of seat tracks, a second fixture is fixed to one of the pair of seat tracks at a point separated from the first fixture, and a third fixture is fixed to another one of the pair of seat tracks at a corresponding portion between the first fixture and the second fixture.

6 Claims, 10 Drawing Sheets

(56) References Cited

U.S. PATENT DOCUMENTS

| | | | | |
|---|---|---|---|---|
| 2008/0088166 A1* | 4/2008 | Gardiner | ............. | B64D 11/064 297/344.14 |
| 2010/0051746 A1* | 3/2010 | Law | ...................... | A61G 5/125 244/118.6 |
| 2013/0256496 A1 | 10/2013 | Majuhas | | |
| 2015/0202992 A1 | 7/2015 | Cailleteau | | |
| 2017/0152046 A1 | 6/2017 | Ozaki et al. | | |

FOREIGN PATENT DOCUMENTS

| | | | |
|---|---|---|---|
| EP | 3374265 | * | 9/2020 |
| JP | 63-128141 U | | 8/1988 |
| JP | 2008-174231 A | | 7/2008 |
| JP | 2015-522475 A | | 8/2015 |
| JP | 2015-214204 A | | 12/2015 |
| WO | 2017081128 A1 | | 5/2017 |

OTHER PUBLICATIONS

International Search Report dated Mar. 20, 2018, issued in counterpart International Application No. PCT/JP2017/045277 (2 pages).
Written Opinion (Form PCT/ISA/237) of the International Searching Authority dated Mar. 20, 2018, issued in counterpart International Application No. PCT/JP2017/045277 (4 pages).

* cited by examiner

SEAT UNIT AND ATTACHMENT METHOD THEREOF

TECHNICAL FIELD

The present invention relates to a seat unit and an attachment method thereof.

BACKGROUND ART

Each seat module of the aircraft of Patent Document 1 includes the seat of one seat unit and a plurality of movable seat members, as well as the ottoman of another seat unit. Also, it is described that by making the plurality of movable seat members flat, and connecting the seat and the ottoman with the flattened seat members, a flat bed can be realized.

In addition, the seat module is provided on a planar member such as a plinth or a pallet that serves as a support structure for supporting the seat module away from the floor. Also, this planar member is fixedly attached to a seat track embedded in the floor.

Instead of the existing four-point fixation, the usage of three-point fixation is described as the attachment method thereof.

CITATION LIST

Patent Literature

[Patent Document 1] Japanese Unexamined Patent Application Publication No. 2008-174231

SUMMARY OF INVENTION

Technical Problem

However, in order to increase the degree of freedom in the arrangement of the seat units, there is a demand to fix three points with only one seat unit.

Accordingly, it is an object of the present invention to provide a seat unit for an aircraft that can be directly fixed at three points to a seat track provided on the floor of the aircraft.

Solution to Problem

In order to achieve the above object, one representative seat unit and the attachment method thereof according to the present invention relates to a seat unit comprising a lower structure of the seat unit and three fixtures configured to attach the lower structure directly to a pair of seat tracks of a mobile body, wherein the three fixtures include a lateral position adjustment member configured to laterally adjust a fitting position with the pair of seat tracks, a first fixture is fixed to one of the pair of seat tracks, a second fixture is fixed to one of the pair of seat tracks at a point separated from the first fixture, and a third fixture is fixed to another one of the pair of seat tracks at a corresponding portion between the first fixture and the second fixture.

Advantageous Effects of Invention

According to the present invention, when the shape of the floor of the aircraft airframe changes, the seat unit itself can also move accordingly, preventing damage to the seat unit.

DESCRIPTION OF EMBODIMENT(S)

First Embodiment

Figure 1:
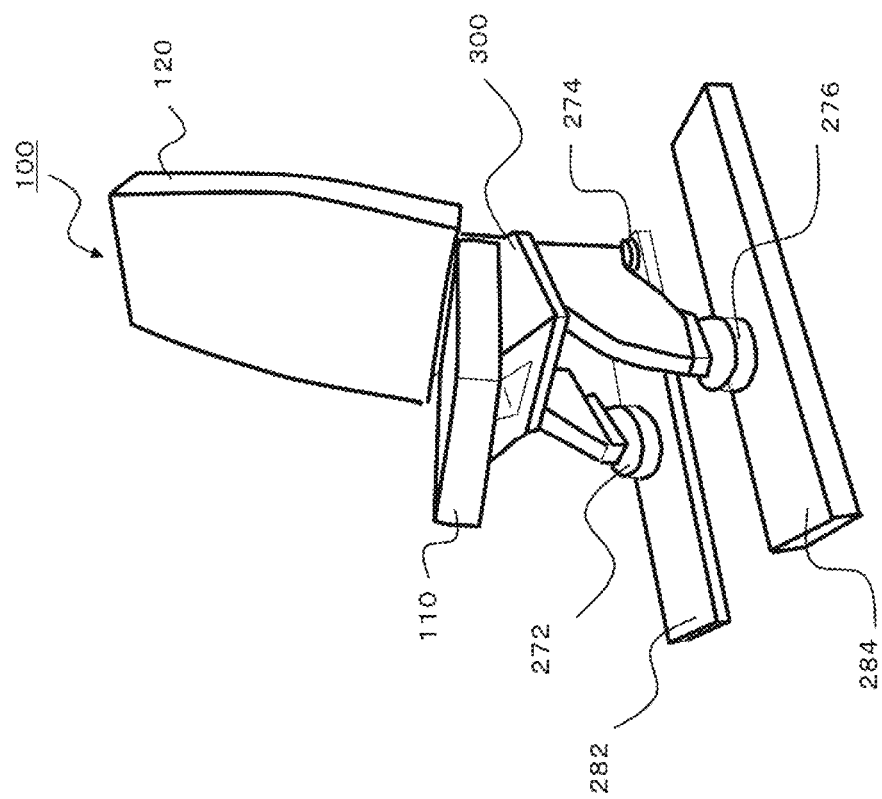
FIG. 1 is a front perspective view of a seat unit according to a first embodiment.

FIG. 1 is a view of the seat unit according to the first embodiment as viewed diagonally from the front, and is an experimental manufacture of an economy class seat unit for arrangement in the cabin of an aircraft. It should be noted that, when an actual seat unit is installed in an aircraft, an armrest portion, a seat belt, and the like are also arranged, but as FIG. 1 illustrates an experimental manufacture, these are omitted for convenience of description.

(Overall Configuration)

The seat unit 100 includes a lower seat 110, an upper seat 120, and a seat base 300. The lower seat 110 may also be referred to as a seat, the upper seat 120 may also be referred to as a backrest, and the seat base 300 may also be referred to as a lower structure. The lower seat 110 and the upper seat 120 include cushion members, and the seat base 300 is formed of metal.

The first seat track 282 and the second seat track 284 constitute a pair of seat tracks and extend in the longitudinal direction of the aircraft airframe. In the aircraft, by fixing the seat base 300 to a pair of seat tracks, the seat unit 100 is attached to the aircraft airframe, and it is necessary for this seat unit 100 to pass a predetermined dynamic load test to ensure passenger safety.

The bottom of the seat base 300 is fixed to the first seat track 282 via a first fixture 272 and a second fixture 274, and is also fixed to the second seat track 284 via a third fixture 276. It should be noted that the fixtures (272, 274, 276) and the seat tracks (282, 284) in FIG. 1 are experimental manufactures, and the structures of the actual fixtures and seat tracks will be described later.

Figure 2:
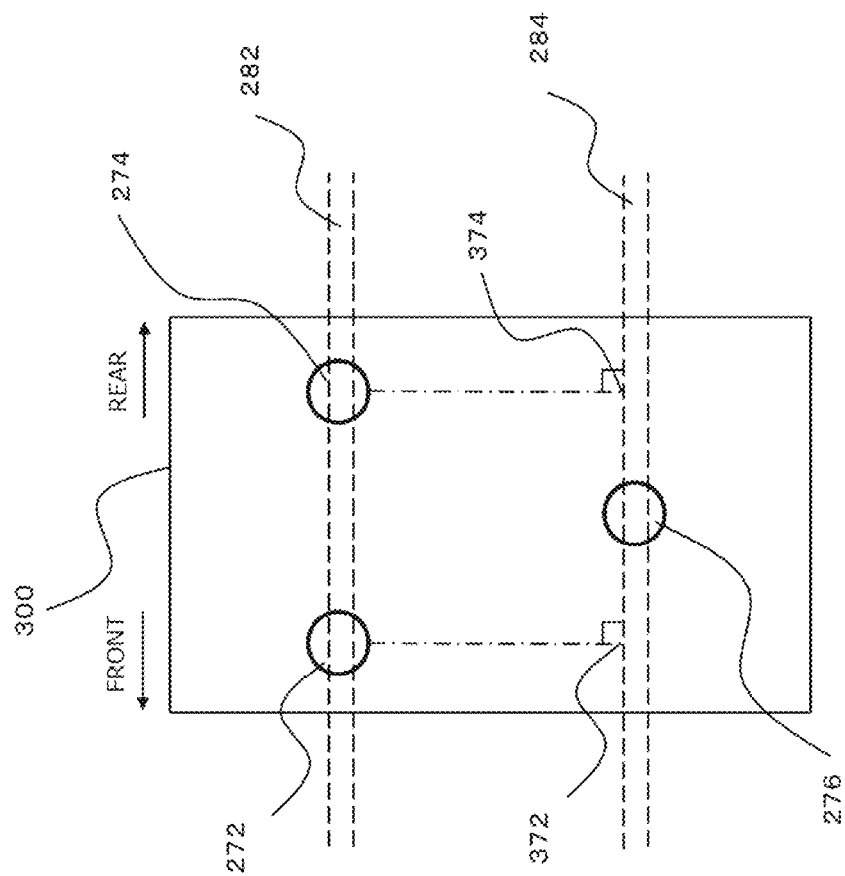
FIG. 2 is a diagram for explaining the positional relationship between a seat track and a fixture according to the first embodiment.

FIG. 2 is a diagram for explaining the positional relationship between the seat tracks and the fixtures. The first fixture 272 is attached to the first seat track 282 at the front of the seat base 300. The second fixture 274 is attached to the first seat track 282 at the rear of the seat base 300. That is, the second fixture 274 is fixed to the first seat track 282 at a point separated from the first fixture 272.

The vertical leg extending down from the first fixture 272 to the second seat track 284 is 372, and the vertical leg extending down from the second fixture 274 to the second seat track 284 is 374. The third fixture 276 is fixed to the second seat track 284 between the front vertical leg 372 and the rear vertical leg 374.

The area between the front vertical leg 372 and the rear vertical leg 374 corresponds to the portion of the second seat track 284 between the first fixture 272 and the second fixture 274. In FIG. 2, the third fixture 276 is fixed substantially at the center of this corresponding portion.

In the case that the entire interval from the front vertical leg 372 to the rear perpendicular leg 374 is represented as 100%, the substantial center of the corresponding portion is preferably such that its distance from the front vertical leg 372 to the third fixture 276 is within an interval of 30% to 70%, and more preferably within an interval of 40% to 60%.

Although the seat base 300 squarely faces the first seat track 282 and the second seat track 284 in FIG. 2, it may also be inclined. Also, even in the case that it is inclined, the third fixture 276 may be fixed substantially at the center between the front vertical leg 372 and the rear vertical leg 374.

The order in which to attach the fixtures to the seat tracks is as follows: first, the first fixture 272 is fixed to the front of the first seat track 282, next, the second fixture 274 is fixed to the first seat track 282 at a point separated from the first fixture 272, and finally, the third fixture 276 is fixed to the second seat track 284 at the corresponding portion between the first fixture 272 and the second fixture 274.

Figure 3:
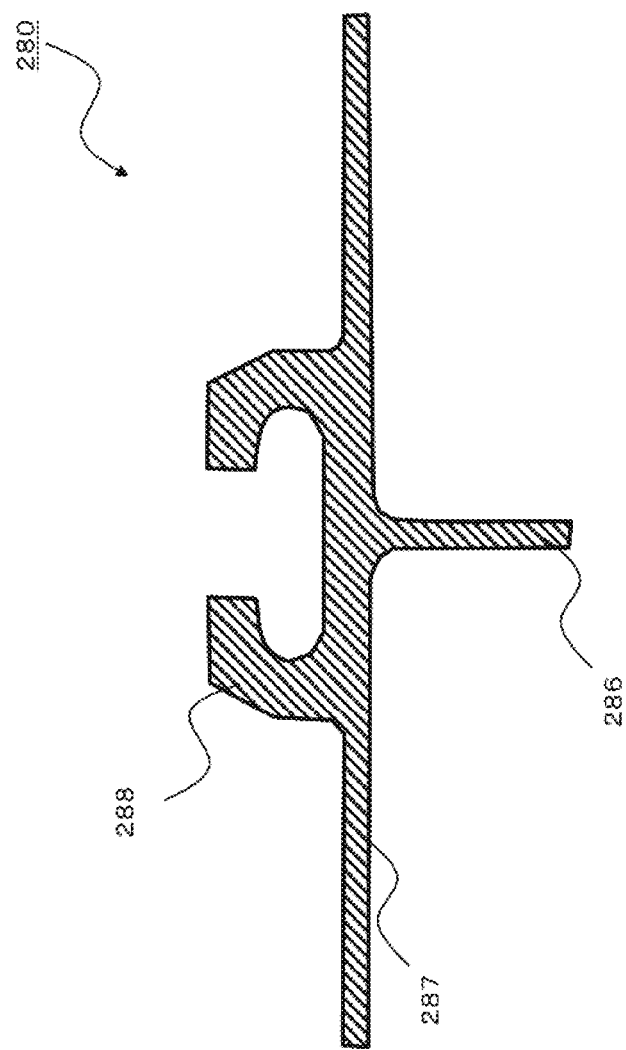
FIG. 3 is a cross-sectional view of a seat track.

FIG. 3 is a cross-sectional view of the structure of the seat track. On the airframe of the aircraft, the seat track 280 is arranged on the floor of the airframe along the longitudinal direction of the aircraft (the direction perpendicular to the plane of the drawing of FIG. 3). The seat track 280 includes an underfloor structure 286 that serves as a structural component under the floor of the aircraft airframe, a flat portion 287 that supports the floor plate, and a seat track side fitting portion 288.

Figure 4:
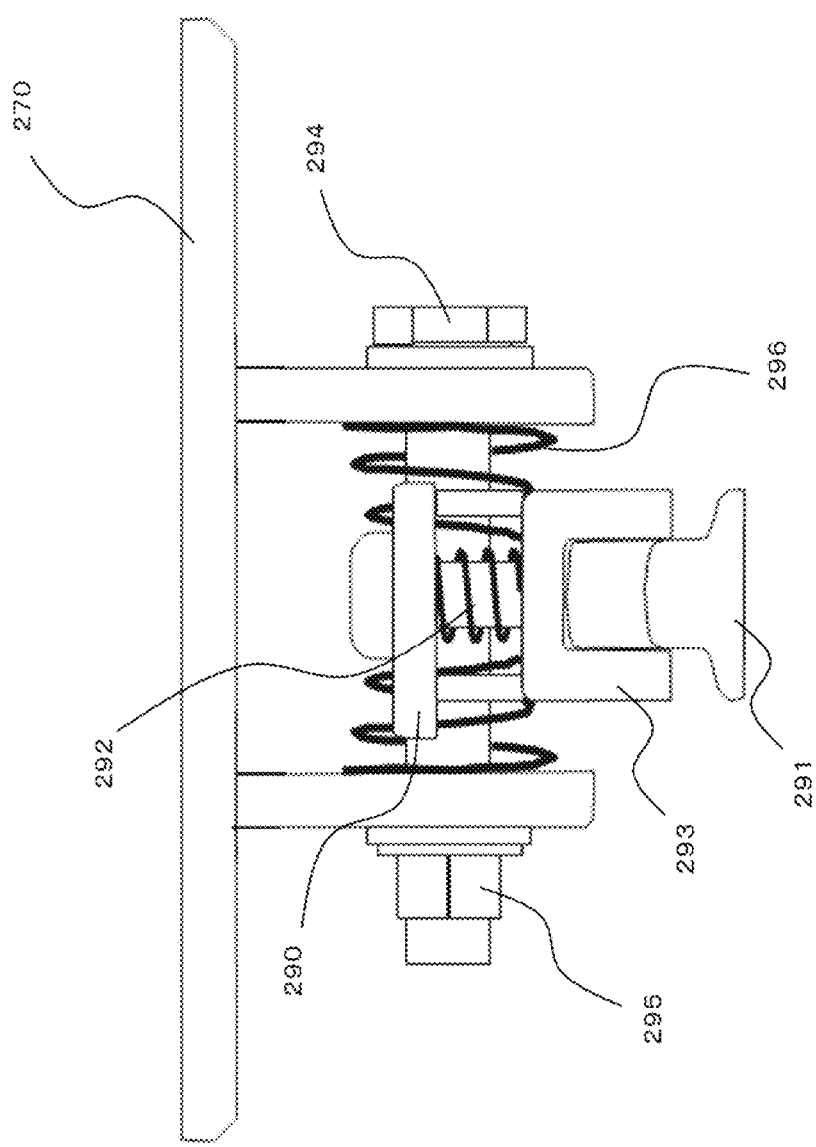
FIG. 4 is an enlarged view around a track fitting member according to the first embodiment.

FIG. 4 is an enlarged view of the area around the track fitting member according to the first embodiment. The seat unit is secured to the seat track by the track fitting member. The fixture 270, also referred to as a fitting bracket, is fixed to the seat track. The fitting side fitting portion 291 is fixed to the fitting portion 288 on the seat track side. The track fitting member is formed by forged iron, and the fitting side fitting portion 291 is a circle having a diameter of from 10 mm to 15 mm.

The track fitting member 290 is provided with a bolt 294 and a nut 295 for causing the plunger 293 to engage with the seat track 293 and assume the load on the front and rear of the airframe, and for fixing the fixture 270. In addition, a lateral spring 296 is provided to prevent shifting when a margin is provided to allow for deviation in the distance between the pair of left and right track fittings. The lateral spring 296 presses the fitting side fitting portion 291 to the center from both the left and right sides.

Figure 5:
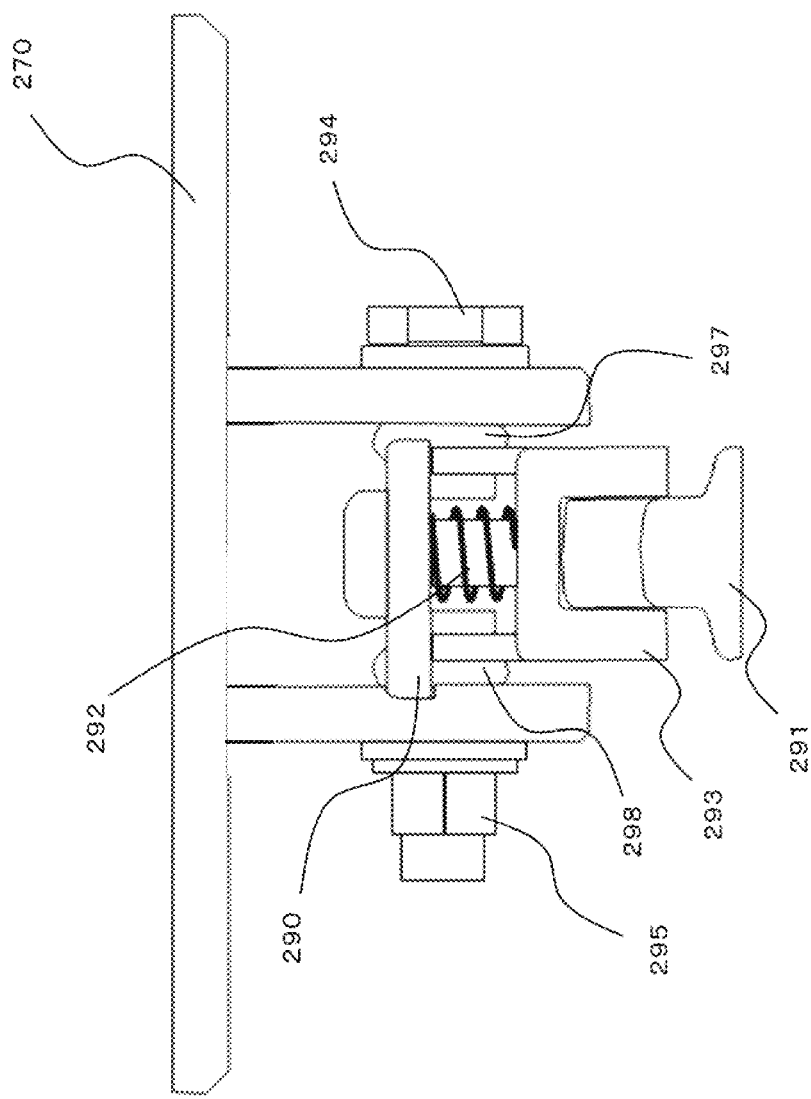
FIG. 5 is an enlarged view around another track fitting member according to the first embodiment.

FIG. 5 is an enlarged view of another track fitting member according to the first embodiment. The difference from FIG. 4 is that a right side buffer member 297 and a left side buffer member 298 are attached between the track fitting member 290 and the fixture 270 in place of the lateral spring 296. The right side buffer member 297 and the left side buffer member 298 are provided with holes through which the externally threaded portion of the bolt 294 passes. The right buffer member 297 and the left buffer member 298 center the fitting side fitting portion 291.

The lateral spring 296 in FIG. 4 as well as the right side buffer member 297 and the left side buffer member 298 in FIG. 5 serve as a lateral position adjustment member for laterally adjusting the fitting position of the fitting side fitting portion 291 and the seat track side fitting portion 288. Having the third fixture 276 of FIG. 2 include such a lateral position adjustment member is most effective in adjusting the deviation in the interval between the left and right track fittings in the case that the floor of the aircraft changes in shape. Furthermore, it is preferable that the three fixtures 272, 274, and 276 of FIG. 2 include the lateral position adjustment member.

(Operational Advantage)

According to the first embodiment, since the lower structure of the seat unit is directly fixed to the pair of seat tracks by the three fixtures, in the case that the shape of the floor of the aircraft airframe changes, the seat unit itself can also move accordingly, which has the effect of preventing damage to the seat unit.

Furthermore, the lateral position adjustment member has an effect of absorbing the deformation of the seat track by adjusting the deviation in the interval between the pair of left and right track fittings in the case that the floor of the aircraft airframe is deformed.

Second Embodiment

Next, a second embodiment will be described with reference to FIG. 6 to FIG. 10. In the second embodiment, a seat unit for business class and first class that is arranged in the cabin of an aircraft will be described.

(Overall Structure)

Figure 6:
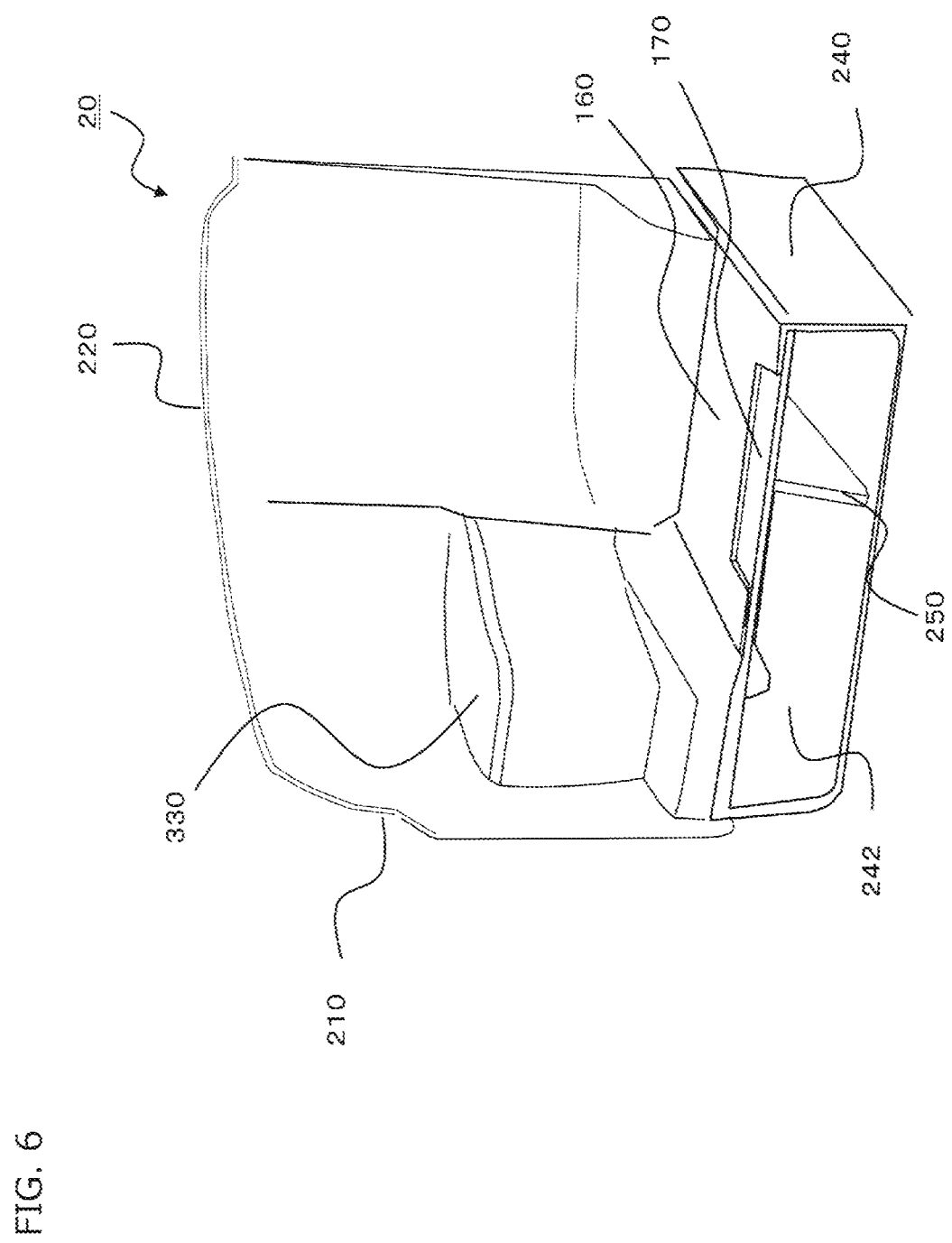
FIG. 6 is a front perspective view of a shell structure according to a second embodiment.

FIG. 6 is a perspective view of a shell structure that combines the lower structure and the upper shell of a seat unit according to the second embodiment, as viewed obliquely from the front.

In FIG. 6, the shell 20 is constituted by a seat base 240 which serves as the lower structure of the seat unit and an upper shell present thereon. Also, the upper shell is constituted by a right side shell 210, a rear side shell 220 that covers the entire rear side, and a left side shell (not illustrated in the Figures). As FIG. 6 is a perspective view, the left side shell is not depicted, but it may have the same configuration as that of the right shell 210.

The seat base 240, which serves as the lower structure of the seat unit, is formed in a hollow box shape using integrally formed members. Here, specifically, the integrally formed members are members formed from thermoplastic resins such as polyetherimide or polyetherketoneketone, thermosetting resins capable of appropriately controlling flammability, or composite materials such as carbon graphite fiber, glass fiber, or aramid fiber, and are composite members that contain a core material such as foam or honeycomb. Similarly, the upper may be formed of similar composite members.

Such an integrally formed composite member can form a solid three-dimensional shape without using connection parts such as bolts and nuts. Furthermore, since the integrally formed composite member is formed from the above-described composite materials, the locations that perform anticorrosion processes can be significantly reduced in comparison with the structural members formed from conventional metals.

In addition, the hollow box structure refers to a cylindrical structural shape, which is also known as a monocoque structure. Accordingly, the seat base 240 can support the load of the seat, the passenger, and the equipment used by the passenger (such as the reading light 360).

The hollow region 242 of the seat base 240 is rectangular when viewed from the front of the seat, but may have a quadrilateral shape, such as a trapezoid. In addition, the thickness of the seat base 240, that is, the thickness of the members constituting the lower structure of the seat, are approximately 10 mm to 15 mm.

With such a seat base 240, there is no concept of a column-like support or leg portion for supporting the leg of one seat, the position of which is restricted by the position of the seat track on the airframe side, and as a result, there is no position restriction due to the position of the seat track on the airframe side. Accordingly, regardless of the shape of the upper structure of the seat, a common structure can be adopted for seats of various sizes and shapes. In addition, since the installation of electric devices and the arrangement of the wiring associated therewith are not restricted by the position of the leg portion, the degree of freedom and commonality in design can be expanded.

In addition, in the hollow region 242, a partition member 250 can be disposed. Since the seat base 240 has a hollow monocoque structure, the partition member 250 (sometimes referred to as a partition) need not support the load of a passenger or the like, and can freely move within the hollow region 242.

The right side shell 210, the rear side shell 220 that covers the entire back side, and the left side shell (not illustrated in the Figures) are also formed using integrally formed members similar to the seat base 240.

FIG. 6 illustrates a state prior to attachment of the seat 10. An upper seat support 160 for supporting the upper seat 120 of the seat 10 is disposed on the seat base 240. In addition, a storage box 330 that serves as both a console and a leg space for the rear seat is disposed on the right of the upper seat support 160.

As the seat base 240 itself has a monocoque structure, it has a considerable degree of strength. However, it is also possible to further provide a local reinforcing member 170 on the upper surface of the seat base 240 where the seat 10 is mounted. By adding local reinforcing members 170 to prevent stress concentration of the load from the passenger, the load can be distributed.

Figure 7:
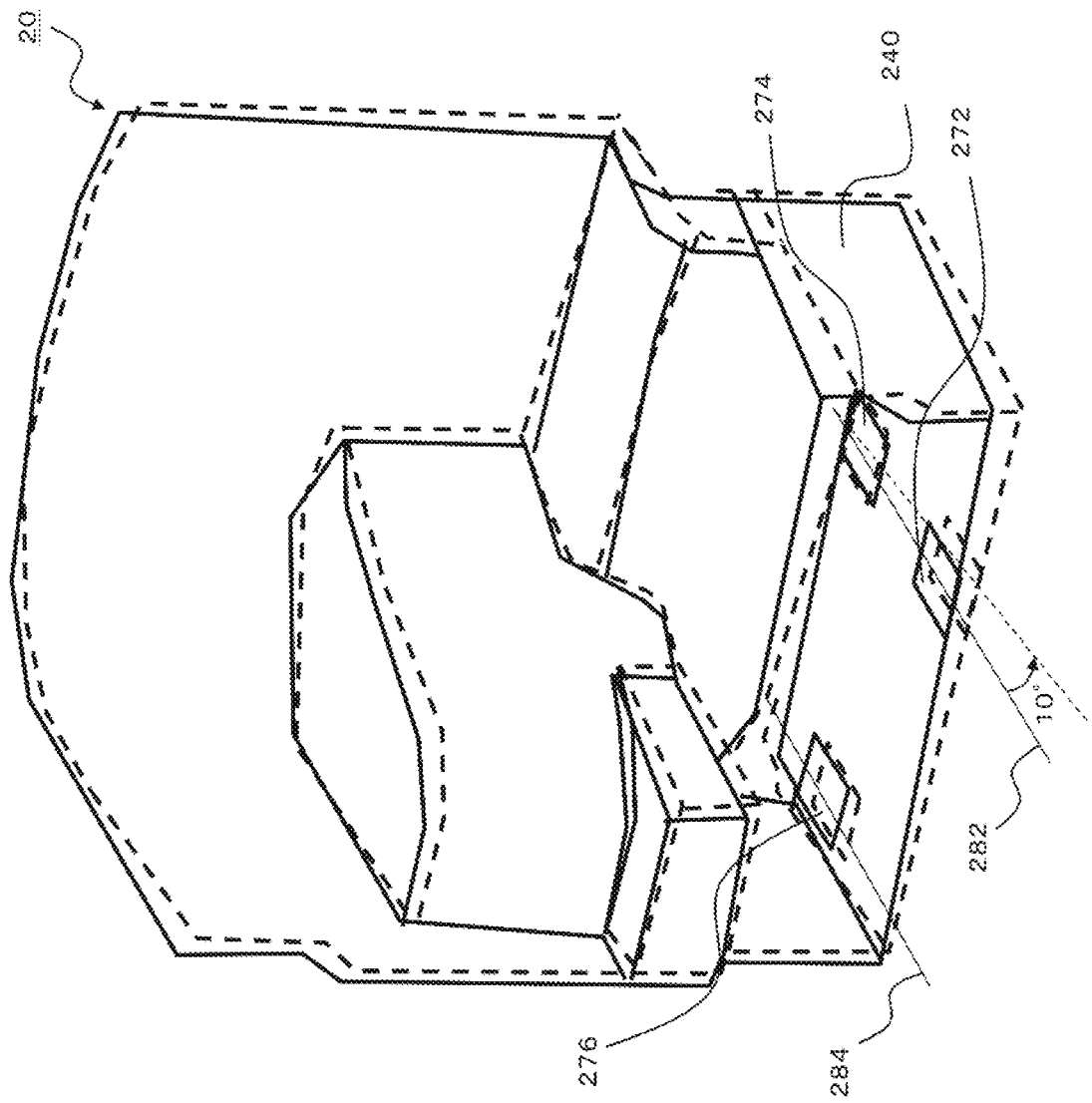
FIG. 7 is a diagram for explaining a case in which the shell structure according to the second embodiment is displaced.

FIG. 7 is a diagram for explaining a case in which the shell structure according to the second embodiment is displaced. The first fixture 272 that is fixed to the front of the first seat track 282, the second fixture 274 fixed to the rear of the first seat track 282, and the third fixture 276 that is fixed to the second seat track 284 at the corresponding portion between the first fixture 272 and the second fixture 274 are arranged at the bottom of the seat base 240.

In FIG. 7, the solid line represents the shell structure prior to displacement, and the dotted line represents the shell structure after displacement. The conditions for this displacement simulation are such that the second seat track 284 does not shift with respect to the reference line, and the front of the first seat track 282 (on the first fixture 272 side) shifts by 10° diagonally downward starting from the rear of the first seat track 282 (on the second fixture 274 side).

In this way, even if the interval between the pair of seat tracks 282 and 284 changes, the seat base 240 fixed to the pair of seat tracks 282 and 284 via the three fixtures 272, 274 and 276 moves diagonally downward, and the shell 20 can also move accordingly.

Figure 8:
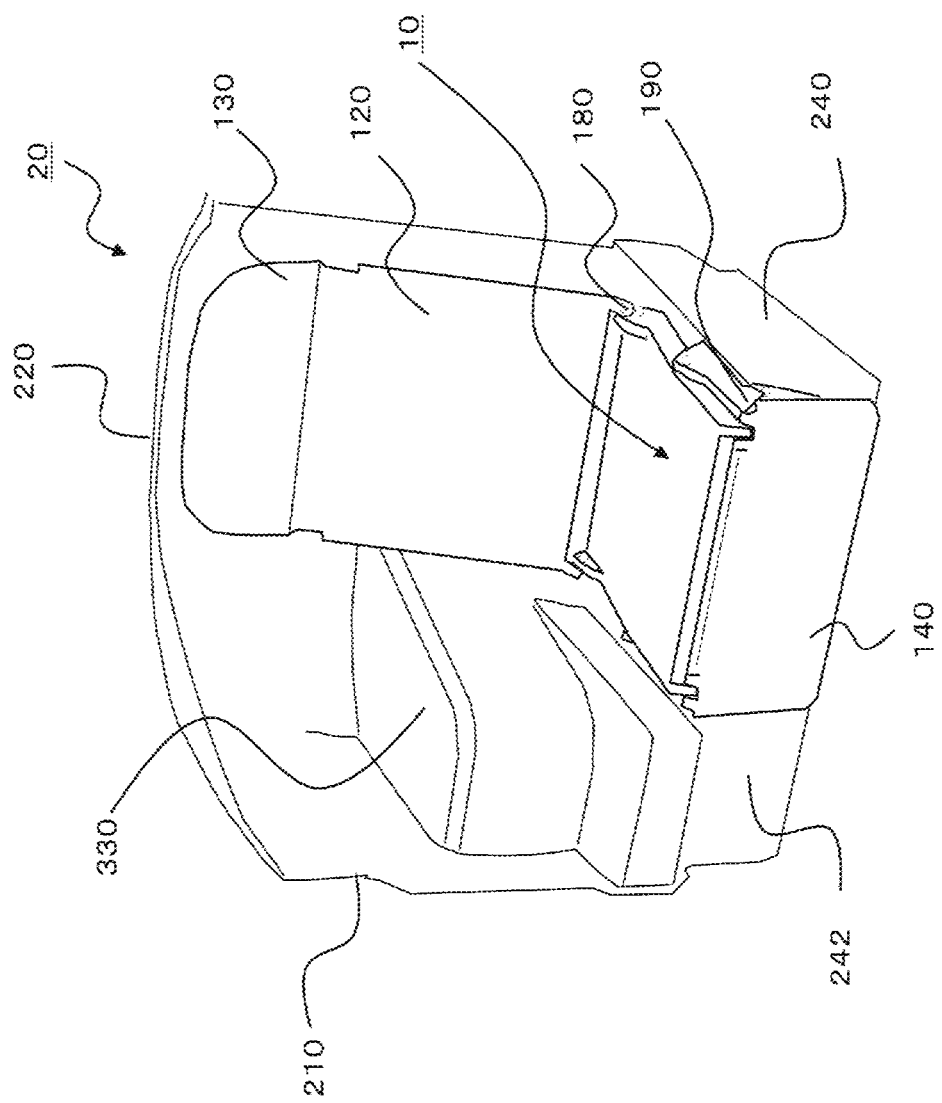
FIG. 8 is a front perspective view of a seat unit according to the second embodiment.

FIG. 8 is a perspective view of the seat unit according to the second embodiment as viewed obliquely from the front. The seat unit has a configuration in which a seat 10 that includes a lower seat 110 on which a passenger sits, an upper seat 120 to serve as a backrest, a headrest 130 that allows passengers to rest their head and neck or the like, and a leg rest 140 for passengers to rest their legs and reduce fatigue on their calves or the like is provided on the shell 20 described with reference to FIG. 6.

The seat reclining mechanism 180 is a mechanism that tilts the upper seat 120 rearward. The foot reclining mechanism 190 is a mechanism that rotates the leg rest 140 so as to lift it toward the surface of the lower seat 110.

Figure 9:
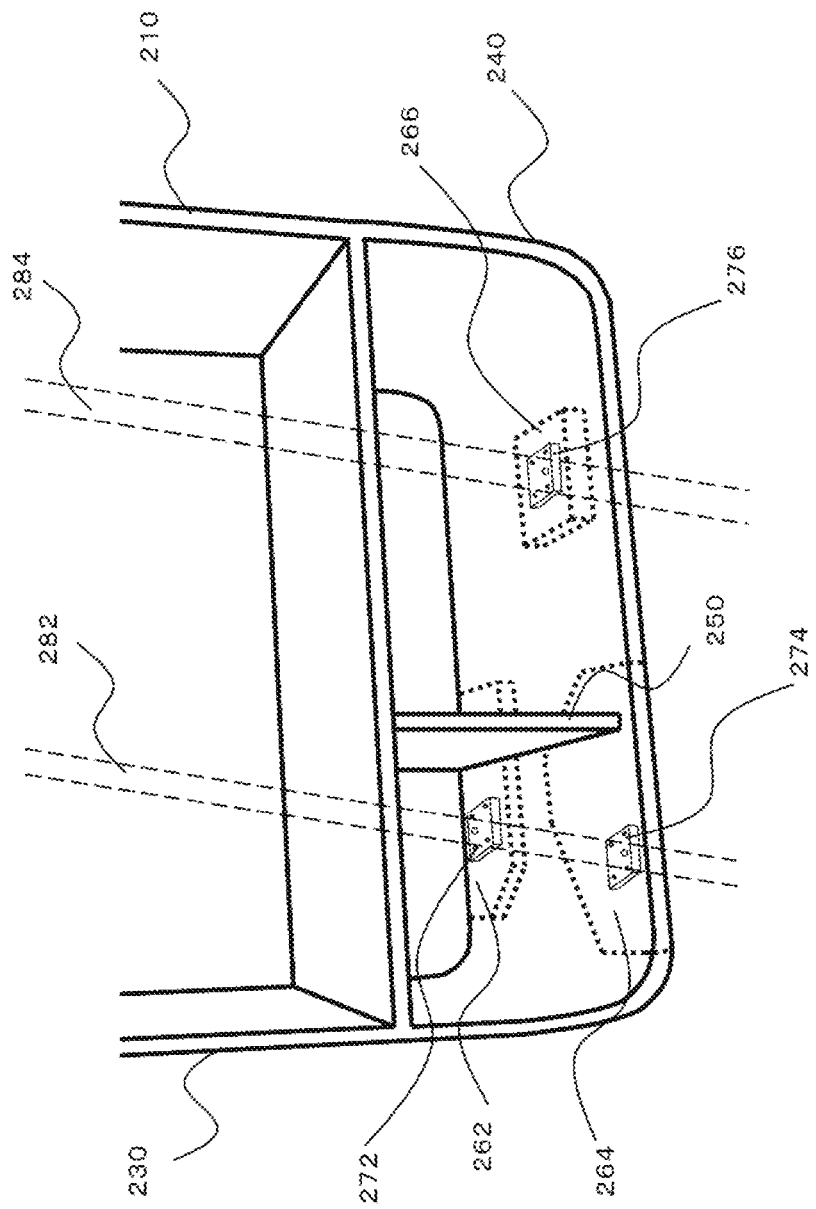
FIG. 9 is a rear perspective view of a seat base according to the second embodiment.

FIG. 9 is a perspective view of a seat base that serves as the lower structure of the seat unit according to the second embodiment, as viewed obliquely from the rear. For convenience of description of the seat track (to be described later), the shell 20 omits the rear side shell 220, while the right side shell 210 and the left side shell 230 are illustrated.

The first seat track 282 and the second seat track 284 are arranged in a substantially parallel manner to form the pair of seat tracks, and extend in the longitudinal direction of the airframe of the aircraft. In FIG. 11, the seat base 240 is disposed slightly leftward with respect to the longitudinal direction of the aircraft airframe. For this reason, the seat base 240 does not squarely face the first seat track 282 and the second seat track 284, but faces slightly to the left.

It should be noted that in the case of the actual seat track, the position of the seat track may differ depending on the type of the aircraft airframe. In addition, there may also be cases where the pair of seat tracks to which the seat unit is fixed is selected from two or more seat tracks.

At the bottom of the seat base 240, three mounting blocks are inserted (the mounting blocks are shown with dotted lines). The seat base 240 is secured to the three fixtures for attachment to the aircraft airframe via the three mounting blocks. Since the seat base 240 is a monocoque structure, mounting blocks are provided at the bottom of the seat base 240 and are used to reinforce the connection between the fixture and the seat base 240. The material of the mounting block is preferably made of metal or the like, but the material is not limited as long as it is a reinforcing block.

In FIG. 9, in order to attach the seat base 240 to the aircraft airframe in three locations, the first mounting block 262 is inserted in front of the bottom of the seat base 240 and the second mounting block 264 is inserted behind it. The third mounting block 266 is inserted on the right side.

Below each mounting block, the fixtures for the seat track are respectively arranged (the fixtures are indicated by solid lines). That is, a first fixture 272 is disposed below the first mounting block 262 and is attached to the first seat track 282. A second fixture 274 is disposed below the second mounting block 264 and is mounted to the first seat track 282 at a point separated from the first fixture 272.

In addition, a third fixture 276 is disposed below the third mounting block 266 and is attached to the second seat track 284 at a corresponding location between the first fixture 272 and the second fixture 274. Preferably, the third fixture 276 is mounted approximately at the center of a corresponding location between the first fixture 272 and the second fixture 274.

In this way, using the three fixtures to secure the seat base 240 to the pair of seat tracks eliminates the need for mounting the seat base 240 at an orientation that squarely faces the seat tracks. This makes it possible to significantly improve the degree of freedom in mounting the seat with respect to deviations of the airframe, as well as the compliance required at the time of seat certification with respect to floor surface deformations.

The order in which to attach the fixtures to the seat tracks is as follows: first, the first fixture 272 is fixed to the front of the first seat track 282, next, the second fixture 274 is fixed to the first seat track 282 at a point separated from the first fixture 272, and finally, the third fixture 276 is fixed to the second seat track 284 at the corresponding portion between the first fixture 272 and the second fixture 274. By first attaching the first fixture 272 near the front of the seat base 240, it becomes easier to perform alignment with the seat track.

Figure 10:
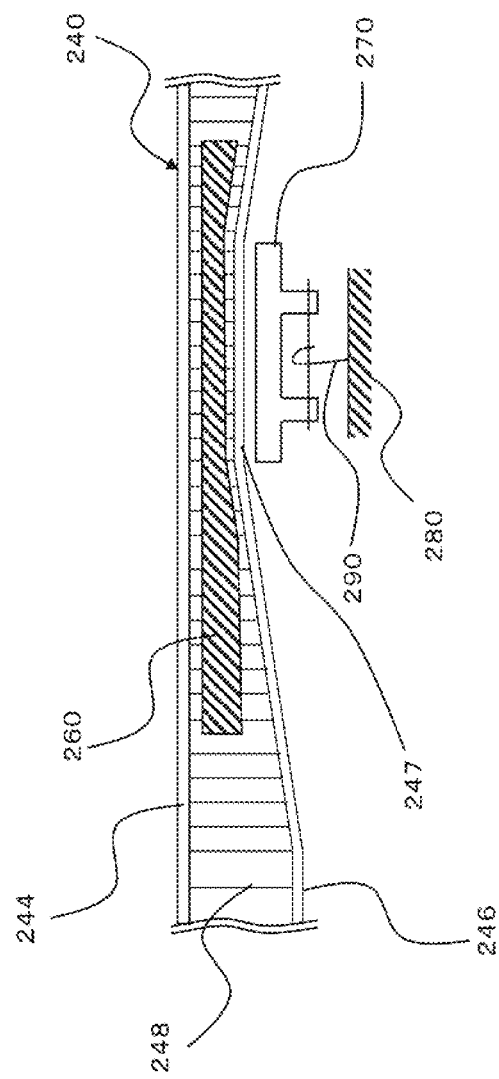
FIG. 10 is an enlarged view of the area around the bottom of the seat base according to the second embodiment.

FIG. 10 is an enlarged view around the bottom of the seat base 240 according to the second embodiment. The bottom of the seat base 240 forms a honeycomb structure 248 between the inner surface 244 on the hollow region 242 side and the opposite outer surface 246. In the honeycomb structure 248, a mounting block 260 is disposed. The mounting block 260 and the fixture 270 are fixed by bolts and nuts or the like. The material of the inner surface 244 and the outer surface 246 is, for example, a composite fiber of resin and fiber. The material of the honeycomb structure 248 is, for example, a composite fiber of noncombustible paper and phenol resin.

The thickness of the mounting block 260 below which the fixture 270 is disposed is reduced. The thickness of the bottom of the seat base 240, below which the fixture 270 is arranged, is similarly reduced. By making the bottom of the seat base 240 and a portion of the mounting block 260 thin in this way and providing the recess 247, the inner surface 44 of the seat base 240 can be kept flat, which is convenient for passengers to place their legs and store luggage in the hollow region 242.

The fixture 270 is secured to the seat track 280 by a track fitting member 290.

(Operational Advantage)

According to the second embodiment, the same effect as that of the first embodiment can be achieved, and further, by using a seat base which is an integrally formed hollow box type lower structure, the influence of the position of the seat track on the airframe side can be eliminated, and this has the effect of increasing the degree of freedom in the mounting position of the seat base.

In addition, in the case that the seat unit does not face the seat track squarely and is arranged at an angle, if the aircraft airframe changes in shape it can be assumed that the impact on the seat unit will be significant, but when the above-described seat base is utilized, since the seat unit itself can also move in accordance with the deformation, damage to the seat unit can be prevented.

It should be noted that the present invention is not limited to the above-described embodiments, but also includes various modifications that can be applied to seats in fields other than aircraft. For example, the present invention can also be suitably used for other types of vehicles, such as trains, long-distance buses, and passenger ships, as well as water transport systems including ferries and hovercraft. In addition, the above-described embodiments are described in detail in order to explain the present invention in an easy-to-understand manner, and are not necessarily limited to include all of the described configurations.

Also, a portion of the configuration of one embodiment can be replaced with the configuration of another embodiment, and the configuration of one embodiment can be added to the configuration of another embodiment. Further, it is possible to add, delete, or replace a portion of one configuration with a portion of the configuration of another embodiment. For example, it goes without saying that the seat base 240 described in the second embodiment and the upper shell 20 may be integrally formed, in which case the strength of the shell is further increased.

REFERENCE SIGNS LIST

10 Seat
20 Shell
100 Seat unit
110 Lower seat
120 Upper seat
130 Headrest
140 Legrest
160 Upper seat support structure
170 Reinforcing member
180 Seat reclining mechanism
190 Foot reclining mechanism
210 Right side shell
220 Rear side shell
230 Left side shell
240, 300 Seat base
242 Hollow region
244 Inner surface
246 Outer surface
247 Recess
248 Honeycomb structure
250 Partition member
260 Mounting block
262 First mounting block
264 Second mounting block
266 Third mounting block
270 Fixture
272 First fixture
274 Second fixture
276 Third fixture
280 Seat track
282 First seat track
284 Second seat track
286 Underfloor structure
287 Flat portion
288 Seat track side fitting portion
290 Track fitting member
291 Fitting side fitting portion
292 Vertical spring
293 Plunger
294 Bolt
295 Nut
296 Lateral spring
297 Right side buffer member
298 Left side buffer member
330 Storage box
372, 374 Vertical leg

The invention claimed is:

1. A seat unit comprising:
a lower structure of the seat unit; and
three fixtures configured to attach the lower structure directly to a pair of seat tracks of a mobile body,
wherein
the pair of seat tracks extend in a direction parallel to a seat facing direction;
the lower structure includes a seat base formed in a hollow box shape using integrally formed members which are formed from thermoplastic resins or composite materials and that define a hollow region having a flat bottom surface portion;
the flat bottom surface portion has, on a bottom side thereof and within the flat bottom surface portion, a first recess having a first mounting block, a second recess having a second mounting block, and a third recess having a third mounting block;
the three fixtures include a lateral position adjustment member configured to laterally adjust a fitting position with the pair of seat tracks,
a first fixture is fixed to one of the pair of seat tracks and the first mounting block in the first recess, a second fixture is fixed to the one of the pair of seat tracks and the second mounting block in the second recess at a point separated from the first fixture, and a third fixture is fixed to another one of the pair of seat tracks and the third mounting block in the third recess at a corresponding portion between the first fixture and the second fixture.

2. The seat unit according to claim 1, wherein the third fixture is fixed substantially at a center between 30% and 70% of an interval of the corresponding portion.

3. The seat unit according to claim 2, wherein the third fixture is fixed substantially at a center between 40% and 60% of an interval of the corresponding portion.

4. The seat unit according to claim 1, wherein the lateral position adjustment member is a spring configured to push a fitting portion of the three fixtures with the pair of seat tracks toward a center from both left and right sides.

5. The seat unit according to claim 1, wherein the lateral position adjustment member is a buffer member configured to centrally position a fitting portion of the three fixtures with the pair of seat tracks.

6. A seat unit attachment method for attaching a lower structure of a seat unit to a pair of seat tracks that extend in a direction parallel to a seat facing direction of a mobile body using three fixtures, the method comprising:

structuring the lower structure to include a seat base formed in a hollow box shape using integrally formed members which are formed from thermoplastic resins or composite materials and that define a hollow region having a flat bottom surface portion;

forming, on the flat bottom surface portion and within the flat bottom surface portion, a first recess having a first mounting block, a second recess having a second mounting block, and a third recess having a third mounting block;

fixing a first fixture to one of the pair of seat tracks and the first mounting block in the first recess;

fixing a second fixture to the one of the pair of seat tracks at a point separated from the first fixture and the second mounting block in the second recess; and fixing a third fixture to another one of the pair of seat tracks and the third mounting block in the third recess at a corresponding portion between the first fixture and the second fixture.

* * * * *